United States Patent Office 3,347,516
Patented Oct. 17, 1967

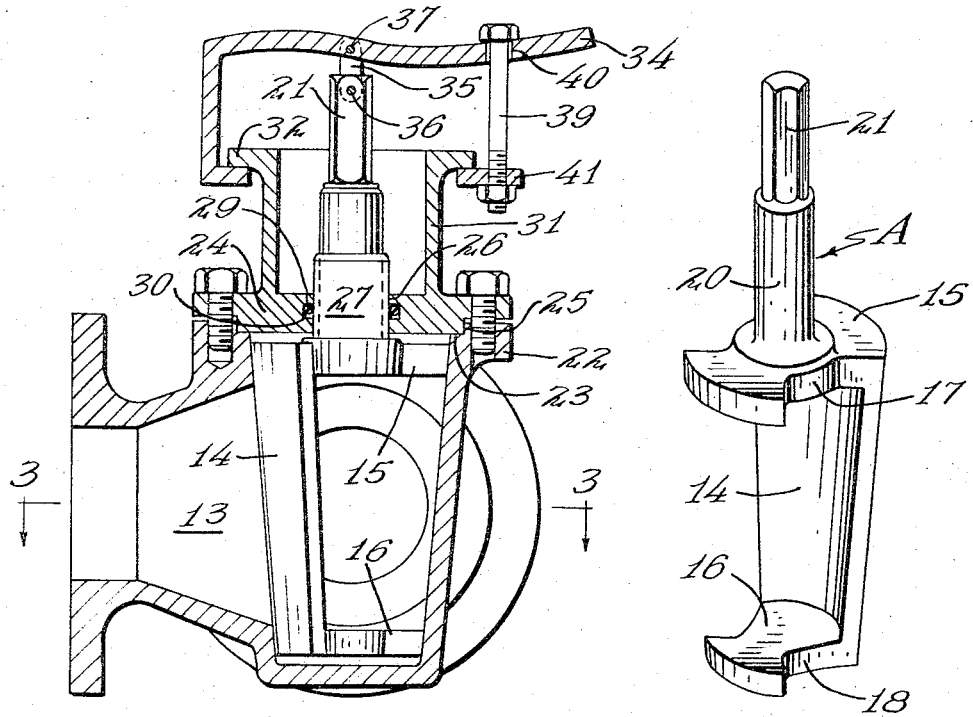
FIG. 1
FIG. 2
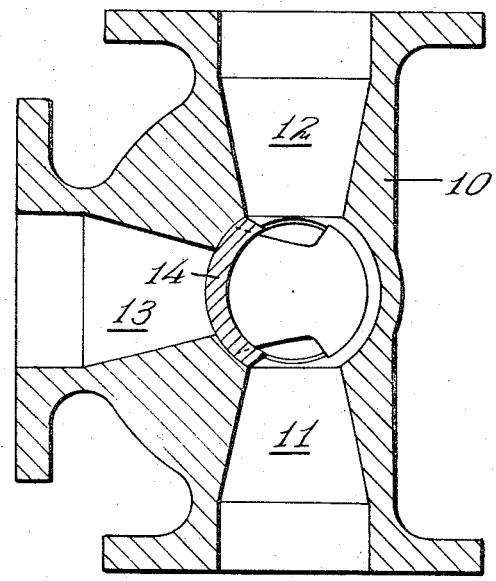
FIG. 3
INVENTOR
RIENARD W. LINDE
BY
ATTORNEY

3,347,516
TAPERED PLUG VALVE
Rienard W. Linde, St. Paul, Minn., assignor to Waldorf Paper Products Company, St. Paul, Minn., a corporation of Minnesota
Filed Feb. 4, 1965, Ser. No. 430,792
2 Claims. (Cl. 251—160)

ABSTRACT OF THE DISCLOSURE

A lift-type tapered plug valve for control of thixotropic materials, the valve housing having a plurality of ports, a frusto-conical seat in the housing, an arcuate frusto-conical gate of a width adapted to close a single selected port, parallel top and bottom guides normal to the gate, notches may be used to reduce frictional engagement of the guides with the seat, a stem extending from the top guide to which a lever arm is connected by which angled force is applied to the gate whereby the gate is simultaneously lifted and rotated to release the gate from its tapered seating readily.

---

This invention relates to an improvement in tapered plug valves and deals particularly with lift-type tapered plug valves for control of thixotropic materials.

My improvement in tapered plug valves may be described in connection with a piping system for clay slurry used in the paper making industry. It is understood, however, that my invention applies to piping systems for thixotropic materials used in any industry.

Desirable features of tapered plug valves such as lever operation, absence of lubrication requirements, ease in turning the valve gate, and self-locking of the valve gate in the valve seat are generally obtained on tapered plug valves presently available. However, these valves are deficient in the respect that they become inoperable after a period of nonuse due to the thickening action of the thixotropic material in the valve. Tapered plug valves used to control the flow of clay slurry, for example, become inoperable after a period of nonuse of about one week. In many instances tapered plug valves in a piping system for clay slurry have become so "jammed" due to the hardening of the clay slurry that valve gate stems or valve gate actuating shafts have been broken in attempts to free the valve. This results not only in the total loss of the valve but in considerable downtime while the piping system is purged and a new valve installed.

It is, therefore, an object of my invention to minimize the incidence of valve jamming inherent in the tapered plug valve designs presently available.

This and other objects and novel features of the present invention will be more clearly and fully set forth in the following specification and claims.

In the drawings forming a part of the specification,

FIGURE 1 is a cross-sectional view of the side elevation of my improved tapered plug valve, the section taken on a plane parallel to the side elevation and through the axis of rotation of the valve gate.

FIGURE 2 is a perspective view of the valve gate assembly as it appears separate from the valve housing.

FIGURE 3 is a cross-sectional view taken on the line 3—3 of FIGURE 1.

FIGURE 3 illustrates the valve in cross section, the view being taken on a plane normal to the axis of the rotatable valve on the line 3—3 of FIGURE 1. The view illustrates the valve housing 10 including three ports spaced at 90°. Ports 11 and 12 are diametrically opposed for straight line flow. Port 13 is spaced 90° from port 11 and 90° from port 12.

The valve housing 10 is provided with a frusto-conical inner surface or valve seat intersected intermediate its ends by the ports 11, 12, and 13. The valve housing 10 is adapted to receive a rotatable gate valve assembly of similar frusto-conical contour. A tapered arcuate frusto-conical gate 14 is shown in FIGURE 3 in position so that fluid flow will follow a straight course between ports 11 and 12. In this position, port 13 is closed.

The valve gate assembly A is shown in perspective in FIGURE 2 of the drawings. As illustrated, the valve gate assembly A is provided with a frusto-conical outer surface to fit the inner surface of the valve housing 10 and the intermediate portion of the valve gate assembly comprises a tapered arcuate frusto-conical gate 14 which connects a top valve guide 15 and bottom valve guide 16. The guides 15 and 16 are parallel, and on planes normal to the axis of the valve. Opposite sides of the guides 15 and 16 are notched as indicated at 17 and 18, respectively, to reduce the frictional engagement between the valve gate assembly A and the valve housing 10.

The tapered arcuate frusto-conical gate 14 is of proper width to selectively close any of the ports 11, 12, or 13. A valve stem 20 is provided extending axially from the upper surface of the top guide 15. The end of the valve stem is extended to form a valve actuating shaft 21 of hexagonal or other multi-sided cross-section form.

FIGURE 1 is a vertical sectional view through the axis of the valve housing 10 showing the tapered arcuate frusto-conical gate 14 in elevation. A flange 22 encircles the top of the valve housing 10, the inner edge of which is rabbeted or grooved as indicated at 23. A top closure plate 24 overlies the flange 22, and includes a cylindrical projection 25 on its under surface which fits snugly into the groove 23. The closure plate includes an axial aperture 26 through which the valve stem 20 extends. A bushing 27 tightly encircles the stem 20 and is sealed with respect to the closure plate 24 by means of an O-ring 29 in a groove 30 in the wall of the aperture 26.

A bonnet 31 projects axially upwardly from the closure plate 24 and is provided at its upper end with a peripheral flange 32. The closure plate and bonnet are secured to the valve housing 10 by bolts 33, the valve operating shaft 21 projecting above the bonnet.

An operating lever arm 34 is linked to the upper end of the actuating shaft 21 by means of a link 35 pivotally connected at 36 to the valve actuating shaft 21 and pivotally connected at 37 to the lever arm.

A valve gate locking means is provided to secure the tapered arcuate frusto-conical gate 14 in the valve housing 10 in the position selected. The locking means includes a screw 39 threaded through the lever arm 34 at lever arm aperture 40 and threaded through a locking block 41 which is adapted to engage bonnet flange 32 in locked position.

In operation, the tapered plug valve takes advantage of the fact that it is easier to separate surfaces which are bonded by the "setting up" of a thixotropic material by taking advantage of the fact that the surfaces are separated more easily by tension forces than by shear forces. The principle of my invention, therefore, is to place the surfaces which may cause "jamming" in tension. This is done by tapering the surfaces of the valve gate which come in contact with the valve seat at an oblique angle to the axis of rotation of the valve gate. It is essential that surface areas parallel to the axis of rotation be kept at a minimum since it is difficult to separate the surfaces with a shearing action. The lever arm 34 is pivoted at the bonnet flange 32 and connected to the valve shaft 21. Therefore, by exerting an upward force on the lever arm 34, the force is transmitted to shaft 21 and subsequently to the tapered arcuate frusto-conical gate 14 and parallel to and extending from the axis of rotation of the tapered arcuate frusto-conical gate 14. However, the contact surfaces of the tapered arcuate frusto-conical gate 14 are at an angle from the axis of rotation and, therefore, the force transmitted to the contact surfaces is at an angle to the surface rather than parallel to the surface. Therefore, a tension force results and the surfaces are more easily separated.

In accordance with the patent statutes, I have described the principle of construction and operation of my improvement in tapered plug valves; and while I have endeavored to set forth the best embodiment thereof, I desire to have it understood that obvious changes may be made within the scope of the following claims without departing from the spirit of my invention.

I claim:

1. A tapered plug valve comprising: a valve housing including inlet and outlet ports, a valve seat tapered at an oblique angle to the axis of rotation of a tapered arcuate frusto-conical gate, a circular opening adapted to receive a valve gate assembly and a top flange adapted to receive a bonnet; a rotatable valve gate assembly including a tapered arcuate frusto-conical gate of a width to close a single selected port received in said valve housing to provide surfaces adapted to be in contact, a top guide integrally mounted on the tapered arcuate frusto-conical gate and extending therefrom so that the guide may rest on the tapered valve seat, a bottom guide parallel to the top guide and substantially normal to the axis of the gate integrally mounted on the tapered arcuate frusto-conical gate and extending therefrom so that the guide may rest on the tapered valve seat, a valve stem integrally mounted on the top guide and exending upwardly therefrom, a sleeve surrounding the valve stem, and a valve actuating shaft integrally mounted on the valve stem extending upwardly therefrom and concentric therewith; a bonnet including a top flange and a bottom mounting ring mounted on the top flange of said valve housing, means for attaching said bonnet to said valve housing, a circular opening surrounding the valve stem and sleeve, an O-ring enclosed within a groove in the circular opening to maintain a seal between the valve housing and the opening through which the valve stem and sleeve protrude; a lever arm hinged under the bonnet top flange and linked to the valve actuating shaft to impart force to said surfaces at an angle to said surfaces so that upward movement and rotative movement may be imparted to the valve actuating shaft; and means for locking said valve gate assembly in said valve housing.

2. A tapered plug valve comprising: a valve housing including inlet and outlet ports, a valve seat tapered at an oblique angle to the axis of rotation of a tapered arcuate frusto-conical gate, an opening adapted to receive a valve gate assembly and a top flange adapted to receive a bonnet; a rotatable valve gate assembly including a tapered arcuate frusto-conical gate of a width to close a single selected port received in said valve housing to provide surfaces adapted to be in contact, a top guide mounted on the tapered arcuate frusto-conical gate and extending therefrom so that the guide may rest on the tapered valve seat, a bottom guide generally parallel to said top guide and normal to the axis of the gate mounted on a tapered arcuate frusto-conical gate and extending therefrom so that the guide may rest on the tapered valve seat, a valve stem mounted on the top guide and extending upwardly therefrom, and a valve actuating shaft mounted on the valve stem extending upwardly therefrom and concentric therewith; a bonnet including a top flange and a bottom mounting flange mounted on the top flange of said valve housing, means for attaching said bonnet to said valve housing, an opening surrounding the valve stem, and means for effecting a seal between the valve housing and the opening through which the valve stem protrudes; and a lever arm hinged under the bonnet top flange and linked to the valve actuating shaft to impart force to said surfaces at an angle to said surfaces by an upward movement and rotative movement to the valve actuating shaft.

References Cited

UNITED STATES PATENTS

| Re. 20,973 | 1/1939 | Goldberg | 251—160 |
| 1,084,601 | 1/1914 | Bordo | 251—203 |
| 2,142,550 | 1/1939 | Anderson | 251—162 |
| 2,504,297 | 4/1950 | Bordo | 251—161 |
| 2,879,800 | 3/1959 | Komrosky | 251—160 X |

CLARENCE R. GORDON, *Primary Examiner.*